United States Patent
Gallagher (10) Patent No.: US 9,490,972 B2
(45) Date of Patent: Nov. 8, 2016

(54) METHOD AND APPARATUS FOR PROVIDING CONDITIONAL ACCESS BASED ON CHANNEL CHARACTERISTICS

(71) Applicant: MaxLinear, Inc., Carlsbad, CA (US)

(72) Inventor: Timothy Gallagher, Encinitas, CA (US)

(73) Assignee: Maxlinear, Inc., Carlsbad, CA (US)

( * ) Notice: Subject to any disclaimer, the term of this patent is extended or adjusted under 35 U.S.C. 154(b) by 5 days.

(21) Appl. No.: 14/551,503

(22) Filed: Nov. 24, 2014

(65) Prior Publication Data

US 2015/0156015 A1 Jun. 4, 2015

Related U.S. Application Data

(62) Division of application No. 13/328,721, filed on Dec. 16, 2011, now Pat. No. 8,897,157.

(51) Int. Cl.
| | |
|---|---|
| *H04L 9/00* | (2006.01) |
| *H04K 1/10* | (2006.01) |
| *H04L 9/08* | (2006.01) |
| *H04L 29/06* | (2006.01) |
| *G06F 21/00* | (2013.01) |
| *G06F 21/10* | (2013.01) |
| *H04L 9/18* | (2006.01) |

(Continued)

(52) U.S. Cl.
CPC .............. *H04L 9/0819* (2013.01); *G06F 21/00* (2013.01); *G06F 21/10* (2013.01); *H04L 63/06* (2013.01); *H04L 63/10* (2013.01); *H04K 1/00* (2013.01); *H04K 1/02* (2013.01); *H04L 9/08* (2013.01); *H04L 9/18* (2013.01); *H04L 2209/24* (2013.01); *H04L 2463/101* (2013.01)

(58) Field of Classification Search
CPC ............ H04K 1/00; H04K 1/02; H04L 9/08; H04L 9/18
USPC ..................... 380/225, 262, 33, 44
See application file for complete search history.

(56) References Cited

U.S. PATENT DOCUMENTS

| | | | |
|---|---|---|---|
| 2002/0110245 A1* | 8/2002 | Gruia | H04L 9/12 380/278 |
| 2002/0154055 A1 | 10/2002 | Davis et al. | |

(Continued)

FOREIGN PATENT DOCUMENTS

| | | |
|---|---|---|
| EP | 1494353 A3 | 1/2006 |
| WO | 2009143082 A1 | 11/2009 |
| WO | 2011033342 A1 | 3/2011 |

OTHER PUBLICATIONS

European Search Report for EP 12003194 dated Aug. 24, 2012.

*Primary Examiner* — Aravind Moorthy
(74) *Attorney, Agent, or Firm* — McAndrews, Held & Malloy (57) ABSTRACT

A first network device may discover one or more values of one or more parameters corresponding to a plurality of links and/or devices of the network. The first network device may compare the discovered one or more values of the one or more parameters to an expected one or more values of the one or more parameters. The first network device may determine whether to transmit data onto a network path between the first device and one of the plurality of devices based on a result of the comparison, wherein at least one of the plurality of links and/or devices are not part of the network path. The first network device may be operable to utilize the discovered parameter values to generate a security key which may be utilized to encrypt and/or scramble content prior to transmitting the content onto the network.

16 Claims, 8 Drawing Sheets (51) Int. Cl.
*H04K 1/00* (2006.01)
*H04K 1/02* (2006.01)

(56) References Cited

U.S. PATENT DOCUMENTS

2003/0095664 A1* 5/2003 Asano .............. G11B 20/00086
                                                        380/277
2005/0234735 A1   10/2005 Williams
2006/0262222 A1   11/2006 Monnier et al.
2007/0223512 A1*  9/2007 Cooper ................... H04L 1/206
                                                        370/437
2008/0060024 A1   3/2008 Decanne
2008/0304658 A1* 12/2008 Yuda ...................... H04B 7/043
                                                        380/44
2009/0007189 A1   1/2009 Gutknecht et al.
2009/0113492 A1   4/2009 Norin et al.

* cited by examiner

| Device 1 ID | Device 2 ID | Phase Δ | Freq Δ | Response time |
|---|---|---|---|---|
| 102 | 104a | 9° | 5 Hz | 100 ms |
| 102 | 104b | 20° | 30 Hz | 150 ms |
| 102 | 104c | 15° | 20 Hz | 175 ms |

FIG. 3A

| Device 1 ID | Device 2 ID | Clock offset | Latency |
|---|---|---|---|
| 152 | 104a | 1 ms | 5 ms |
| 152 | 104b | 2 ms | 10 ms |
| 152 | 104c | 1 ms | 16 ms |

FIG. 3B

| Device 1 ID | Device 2 ID | Modulation profile | Tx Power |
|---|---|---|---|
| 152 | 104a | 11011011 | 1110 |
| 152 | 104b | 00110111 | 1100 |
| 152 | 104c | 11110001 | 1001 |

METHOD AND APPARATUS FOR PROVIDING CONDITIONAL ACCESS BASED ON CHANNEL CHARACTERISTICS

CLAIM OF PRIORITY

This application is a divisional of U.S. patent application Ser. No. 13/328,721 filed on Dec. 16, 2011 and now patented as U.S. Pat. No. 8,897,157 which is herein incorporated by reference in its entirety.

INCORPORATION BY REFERENCE

This patent application also makes reference to:

U.S. patent application Ser. No. 13/326,125 entitled "System and Method in a Broadband Receiver for Efficiently Receiving and Processing Signals" and filed on Dec. 14, 2011.

U.S. patent application Ser. No. 13/316,796 entitled "System and Method for Conditional Access in an In-Home Network Based on Multi-Network Communication" and filed on Dec. 12, 2011.

Each of the above-referenced applications is hereby incorporated herein by reference in its entirety.

FIELD OF THE INVENTION

Certain embodiments of the invention relate to networking. More specifically, certain embodiments of the invention relate to a method and apparatus for providing conditional access based on channel characteristics.

BACKGROUND OF THE INVENTION

Conventional methods of network security and content protection are often ineffective. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus is provided for providing conditional access based on channel characteristics, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g." and "for example" introduce a list of one or more non-limiting examples, instances, or illustrations.

Figure 1A:
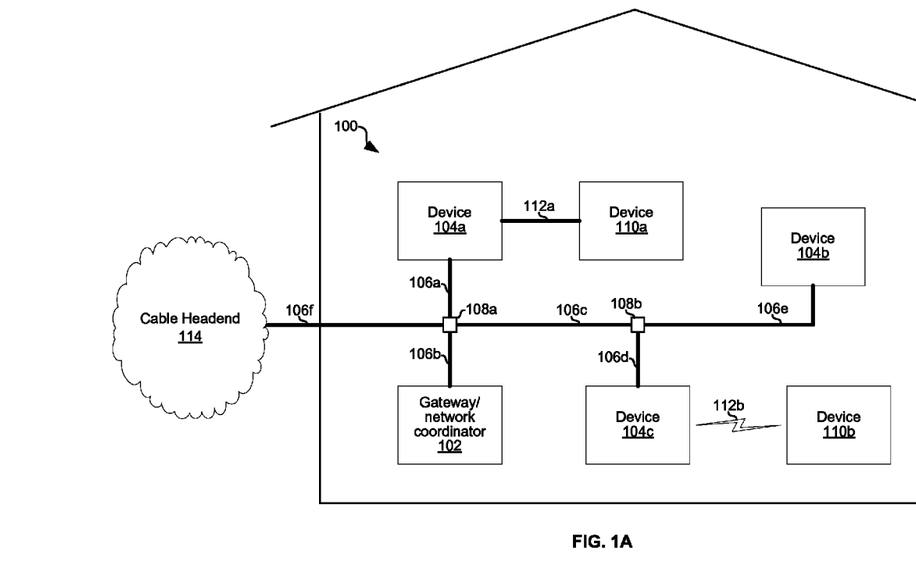
FIG. 1A depicts an exemplary network in which content is protected utilizing a network fingerprint.

FIG. 1A depicts an exemplary network in which content is protected utilizing a network fingerprint. Shown in FIG. 1A is a local area network (LAN) 100 connected to a cable headend 114. The exemplary LAN 100 comprises a gateway 102 and network devices 104a-104c coupled via links 106a-106d and splitters 108a-108b. The LAN 100 also comprises devices 110a-110b coupled to network devices 104a and 104c via links 112a and 112b, respectively.

Each of the links 106a-106f may comprise wired cabling, optical cabling, and/or wireless links. In an exemplary embodiment, each of the links 106a-106f may comprise coaxial cabling. The splitter 108a may be operable to electrically couple links 106a, 106b, 106c, and 106f such that the signal on each of these four links is substantially the same. The splitter 108b may be operable to electrically couple links 106c, 106d, and 106e such that the signal on each of these three links is substantially the same.

The device 102 may comprise circuitry operable to communicate over the links 106a-106f. The circuitry of the device 102 may also be operable to communicate with cable headend 114. The device 102 may be, for example, a set-top box or gateway operable to receive media and data from the cable headend 114 via the links 106f and 106b, process the received media and data, and convey the processed media and data to the devices 104a-104c via the links 106a-106e. In an exemplary embodiment, the device 102 may communicate the processed media and/or data over the links 106b-106e in accordance with multimedia over coaxial alliance (MoCA) standards. In such an embodiment, the device 102 may function as the network coordinator of the MoCA network.

The circuitry of the device 102 may also be operable to discover one or more values of one or more parameters. For example, the circuitry of the device 102 may be operable to measure phase, frequency, and/or timing characteristics of one or more of the links 106a-106f and/or the devices 102, 104a, 104b, and 104c. Additionally or alternatively, the circuitry of the device 102 may be operable to discover parameter values by requesting such values from other devices. Such discovery of parameter values may be performed by a hardware security processor of the device 102.

Each of the devices 104a-104c may comprise circuitry operable to communicate over the links 106a-106e. The device 104c may be, for example, a wireless access point operable to convert between the network protocols (e.g., MoCA or DOCSIS) utilized on the links 106b-106e and the network protocols (e.g., IEEE 802.11) utilized on the link 112b. The device 104a may be, for example, a network adaptor operable to convert between the network protocols (e.g., MoCA or DOCSIS) utilized on the links 106b-106e and the network protocols (e.g., HDMI or USB) utilized on the link 112a.

The circuitry of each of the devices 104a, 104b, and 104c may also be operable to discover one or more values of one or more parameters. For example, the circuitry of the devices 104a, 104b, and 104c may be operable to measure phase, frequency response, and/or timing characteristics of one or more of the links 106a-106f and/or the devices 102, 104a, 104b, and 104c. Additionally or alternatively, the circuitry of the device 102 may be operable to discover parameter values by requesting such values from other devices. Such discovery of parameter values may be performed by a hardware security processor of the devices 104a, 104b, and 104c.

The devices 110a and 110b may comprise circuitry operable to receive media and/or data via the links 112a and 112b, respectively. Each of the devices 110a and 110b may be, for example, an end-point such as a television or personal computer.

In operation, the devices 102 and 104a-104c may exchange signals (e.g., probe signals and/or responses to probe signals) to discover a network "fingerprint." The network fingerprint may comprise a combination of one or more network parameters and values of those parameters that is unique to a desired probability. The number of parameters and corresponding parameter values utilized to generate the fingerprint may depend on the desired probability that the fingerprint be unique. Similarly, the accuracy with which the parameter values are measured may be determined based on the desired probability of uniqueness.

Exemplary parameters for which values may be discovered comprise: physical length of one or more of the links 106a-106f; phase shift introduced by one or more of the links 106a-106f; propagation delay of one or more of the links 106a-106f; a modulation profile, or portion thereof, utilized by one or more of the device 102, the devices 104a-c, and the headend 114; transmit power utilized by one or more of the device 102, the devices 104a-c, and the headend 114; resistance, capacitance and/or inductance of one or more of the links 106a-106f; an amount of time required to receive a response to a particular request from a particular device; reflectivity measured on one or more of the links 106a-106f; unique identifiers of one or more of the devices 102, 104a, 104b, and 104c; frequency response of one or more of the links 106a-106f; frequency of signals transmitted by one or more of the devices 102, 104a, 104b, and 104c transmit onto the links 106a-106f; phase of signals transmitted by one or more of the devices 102, 104a, 104b, and 104c transmit onto the links 106a-106f; how many devices 102 and 104a-104c and/or splitters 108a-108c are present in the network 100; phase offset between clocks in two or more the devices 102, 104a, 104b, and 104c; a frequency offset between clocks in the devices 102, 104a, 104b, and 104c; and a time offset between clocks in two or more of the devices 102, 104a, 104b, and 104c.

In an exemplary embodiment, while determining the network fingerprint, one or more of the devices 102, 104a, 104b, and 104c may discover one or more of the parameter values and securely communicate the results to, for example, the network coordinator 102 and/or the headend 114. In this manner, the device 102 and/or the headend 114 may then generate the fingerprint utilizing the received parameter values. In an embodiment, each of the devices 104a, 104b, and 104c may know only a portion of the parameter values utilized to generate the network fingerprint such that the device 102 and/or the headend 114 are the only devices that know the fingerprint. It is also possible for a device pair such as 104a and 104c to discover unique parameters without the network coordinator 102 or headend 114 being involved in the discovery.

In an exemplary embodiment, the fingerprint may be utilized for protecting the distribution of content to and/or within the network 100. Exemplary steps for such use of the network fingerprint are described below with respect to FIGS. 4-6.

Figure 1B:
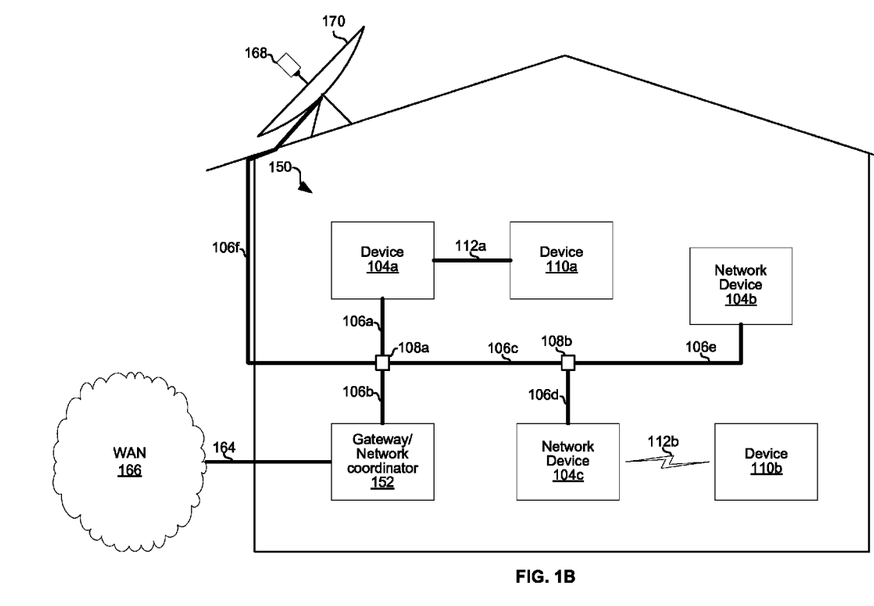
FIG. 1B depicts an exemplary network in which content is protected utilizing a network fingerprint.

FIG. 1B depicts an exemplary network in which content is protected utilizing a network fingerprint. Shown in FIG. 1B is a local area network (LAN) 150 connected to a satellite dish 170 and a wide area network (WAN) 166. The exemplary LAN 150 comprises a gateway 152 and network devices 104a-104c coupled via links 106a-106e and splitters 108a-108b. The LAN 150 also comprises devices 110a-110b coupled to network devices 104a and 104c via links 112a and 112b, respectively. The LAN 150 is coupled to the WAN 166 via a link 164 and to the satellite dish 170 via the link 106f.

Each of the devices 104a and 104c, the links 106a-106f, the splitters 108a and 108b, and the devices 110a and 110b may be as described above with reference to FIG. 1A.

The WAN 166 may be, for example, a digital subscriber line (DSL) network any other suitable wide area network.

The device 152 may comprise circuitry operable to communicate over the links 106a-106f in accordance with a local area networking standard (e.g., MoCA). The circuitry of the device 152 may also be operable to receive and process signals from the satellite 170. The device 152 may be, for example, a set-top box or gateway operable to receive media from the satellite dish 170 via the links 106f and 106b, process the received media, and convey the processed media to the devices 104a-104c via the links 106a-106e. Additionally, the device 152 may be operable to receive data via the link 164, process the received data, and convey the processed data to the devices 104a-104c via the links 106a-106e.

In an exemplary embodiment, the device 152 may communicate the processed media and/or data over the links 106a-106e in accordance with multimedia over coaxial alliance (MoCA) standards. In such an embodiment, the device 152 may function as the network coordinator of the MoCA network.

The circuitry of the device 152 may also be operable to discover one or more values of one or more parameters. For example, the circuitry of the device 152 may be operable to measure phase, frequency, and/or timing characteristics of one or more of the links 106a-106f and/or the devices 152, 104a, 104b, and 104c. Additionally or alternatively, the circuitry of the device 152 may be operable to discover parameter values by requesting such values from other devices. Such discovery of parameter values may be performed by a hardware security processor of the device 512.

The satellite dish 170 may comprise circuitry operable to receive satellite signals and output the received signals onto the communication link 106f. The satellite dish 170 may, for example, comprise an Internet Protocol low noise block-downconverter (IPLNB) 168. The IPLNB 168 may be as described in above-incorporated U.S. patent application No. 13/326,125.

In operation, the devices 152, 104a, 104b, 104c, and 168 may exchange signals to discover a network fingerprint similar to the manner described above with respect to FIG. 1A. In an exemplary embodiment, while determining the network fingerprint, one or more of the devices 152, 104a, 104b, 104c, and 168 may discover one or more of the parameter values and securely communicate the results to, for example, the network coordinator 152 and/or the IPLNB 168. In this manner, the device 152 and/or the IPLNB 168 may then generate the fingerprint utilizing the received parameter values. In an embodiment, each of the devices 152, 104a, 104b, 104c may know only a portion of the parameter values utilized to generate the network fingerprint such that the IPLNB 168 is the only device that knows the fingerprint.

In an exemplary embodiment, the generated fingerprint may be securely communicated to a service provider via the link 164 and the WAN 166. In an exemplary embodiment, the fingerprint may be utilized for protecting the distribution of content to and/or within the network 150. Exemplary steps for such use of the network fingerprint are described below with respect to FIGS. 4-6.

Figure 2:
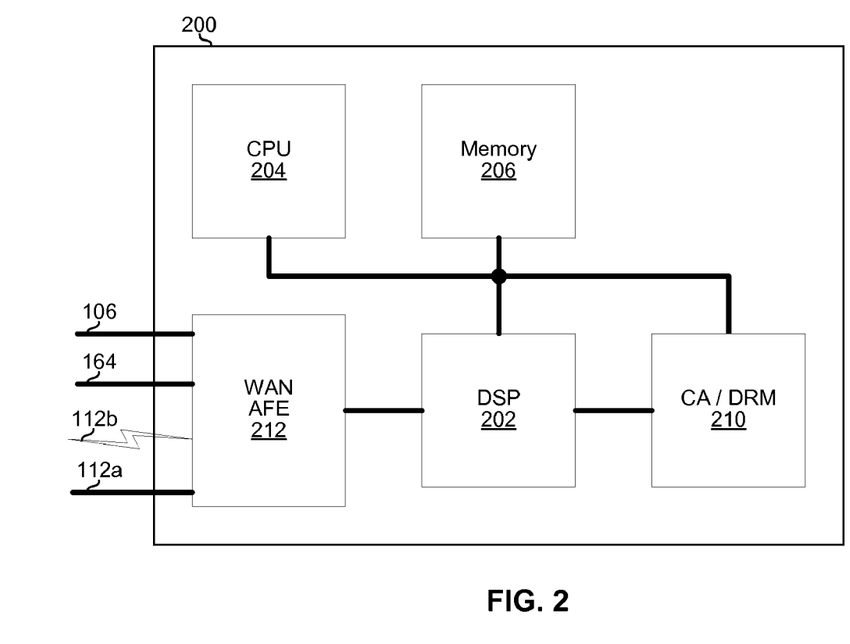
FIG. 2 depicts an exemplary network device for use in a network that is secured utilizing a network fingerprint.

FIG. 2 depicts an exemplary network device for use in a network that is secured utilizing a network fingerprint. The exemplary device 200 comprises a plurality of modules including an analog front end (AFE) 212, a digital signal processor (DSP) 202, a central processing unit (CPU) 204, a memory 206, and a conditional access (CA)/digital rights management (DRM) module 210. The device 200 may represent any of the devices 102, 104a, 104b, 104c, 152, 104a, 104b, and 104c.

The AFE 212 may be operable to transmit and/or receive information utilizing any suitable communication protocol(s). In an exemplary embodiment of the invention, the AFE 212 may be operable to perform analog-domain processing operations that enable transmission and/or reception of signals in accordance with one or more communication protocols. In instances of the device 200 corresponding to devices 102, 104a, 104b, 104c, 152, 104a, 104b, and 104c, the AFE 212 may be operable to transmit and/or receive signals in accordance with, for example, cable television, satellite television, DOCSIS, and/or MoCA standards via a link 106 or 106. In instances of the device 200 corresponding to the device 152, the AFE 212 may be operable to transmit and/or receive signals in accordance with a WAN protocol (e.g., DSL) via a link 164. In instances of the device 200 corresponding to the devices 104a and 104b, the AFE 212 may be operable to transmit and/or receive signals in accordance with a LAN protocol (e.g., Ethernet, Wi-Fi, USB, and/or HDMI) via the one or more links 112.

The CPU 204 may be operable to execute instructions (e.g., an operating system) to control operations of the device 200. For example, the CPU 204 may generate control signals for configuring a mode of operation of the device 200, and controlling operation of the other components of the device 200.

The memory 206 may comprise any suitable type of volatile and/or non-volatile memory operable to store data and/or instructions. For example, the memory 206 may be utilized to store instructions executed by the CPU 204 and buffer data being transmitted and/or received via the AFE 212.

The DSP 202 may be operable to perform digital signal processing algorithms and functions in accordance with one or more communication standards. For example, the DSP 202 may be operable to perform digital filtering, constellation mapping, constellation demapping, interleaving, deinterleaving, and error correction. In an exemplary embodiment of the invention, the DSP 202 may be operable to perform digital-domain processing functions that enable transmission and/or reception of cable television signals, satellite television signals, DOCSIS signals, MoCA signals, and/or signals adhering to one or more other communication protocols.

The conditional access (CA)/digital rights management (DRM) module 210 may comprise circuitry operable to descramble and/or decrypt signals received via one or more of the links 106a-106f. In terms of "conditional access," this may enable descrambling and/or decrypting content that is permitted by a service-level agreement between the content provider (e.g., satellite and/or cable television provider) and the owner of the device 200. In terms of "digital rights management" this may enable the CA/DRM module 210 to decrypt and/or descramble content communicated to it by a device with which it has established a secure connection. In an exemplary embodiment, the CA/DRM module 210 may decrypt and/or descramble utilizing a key generated based on a network fingerprint. Additionally or alternatively, the circuitry of the CA/DRM module 210 may be operable to scramble and/or encrypt signals to be transmitted via one or more the links 106a-106f. In an exemplary embodiment, content may be encrypted and/or scrambled utilizing a key generated based on a network fingerprint.

In an exemplary embodiment, the CA/DRM module 210 may be implemented in a hardware security processor. In an exemplary embodiment, the CA/DRM module 210 may be operable to discover the network fingerprint (e.g., by performing parameter value measurements itself and/or receiving parameter value measurements from other components and/or devices), and decide whether to decrypt, descramble, encrypt, and/or scramble based on the network fingerprint (e.g., by comparing it to a previous or known-good network fingerprint). Ways in which devices such as the device 200 may utilize a network fingerprint for securing content are described below with respect to FIGS. 4-6.

Figure 3A:
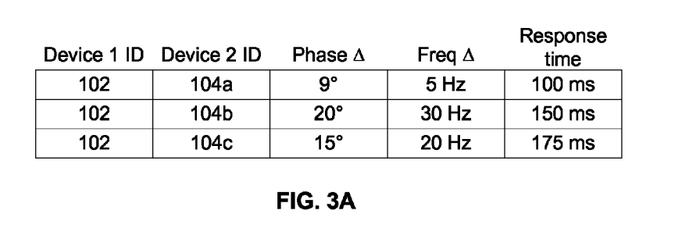
FIGS. 3A, 3B, and 3C depict exemplary network fingerprints.
Figure 3B:
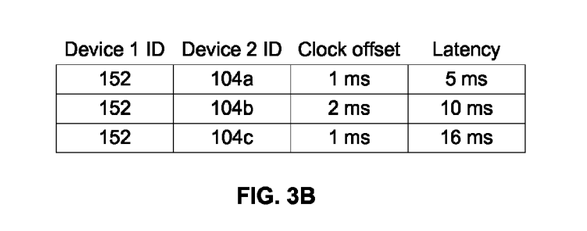
Figure 3C:
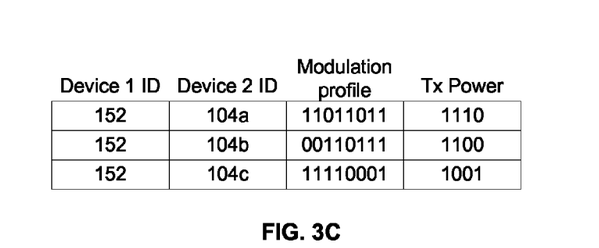

FIGS. 3A, 3B, and 3C depict exemplary network fingerprints for the networks 100 and 150. In the exemplary fingerprint of FIG. 3A, parameters utilized for the fingerprint include unique identifiers of the network devices, phase difference between devices, frequency difference between devices, and time for device 2 to respond to a particular request from device 1. In the exemplary fingerprint of FIG. 3B, parameters utilized for the fingerprint include unique identifiers of the network devices, clock offset between devices, and latency between devices (i.e. time for a particular packet to travel between devices). In the exemplary fingerprint of FIG. 3C, parameters utilized for the fingerprint include unique identifiers of the network devices, a modulation profile utilized for communications between the devices, and a transmit power utilized for communications between the devices. The modulation profile may indicate, for example, a type and/or order of modulation utilized for each of a plurality of subcarriers.

Figure 4:
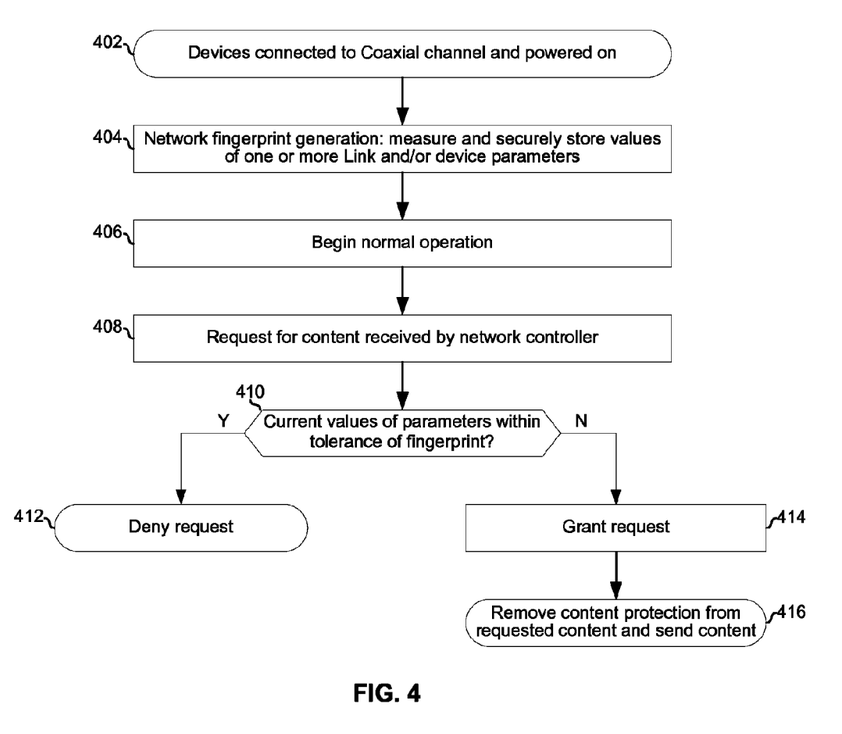
FIG. 4 is a flowchart illustrating exemplary steps for protecting content utilizing a network fingerprint.

FIG. 4 is a flowchart illustrating exemplary steps for protecting content utilizing a network fingerprint. In step 402, the devices 102, 104a, 104b, and 104c may be connected to the channel comprising the links 106a-106f and powered on. In step 404, signals may be communicated among the devices 102, 104a, 104b, and 104c to discover the network fingerprint. This may comprise sending signals to measure the value of one or more link and/or device parameters, and storing the measured parameter values in the device 102. After the network fingerprint has been generated, in step 406, the devices may enter a normal mode of operation.

In step 408, the device 104a may send a request for content to the device 102. In step 410, the device 102 may measure one or more parameter values and/or request parameter values from one or more of the devices 104a, 104b, and 104c to discover the current network fingerprint. The device 102 may then compare the current network fingerprint to the fingerprint generated in step 404.

If the current fingerprint does not match the fingerprint generated in step 404, then in step 412, the request for content may be denied. In this manner, various characteristics of the network 100 may determine whether the request for content from device 104a is granted. If, for example, the network fingerprint is one of the fingerprints shown in FIGS. 3A and 3B, then the determination of whether to grant the request may be based not only on parameter values corresponding to the network path between the source device 102 and the destination device 104a (i.e., the network path consisting of devices 102 and 104a, and links 106a and 106b), but also on one or more parameter values corresponding to devices and/or links that are not part of the network path between source device and destination device (i.e., devices 104b and 104c, and links 106c, 106d, and 106e).

For example, if an additional link and device were connected to a fourth port of splitter 108b, parameters values of the network path between device 102 and 104a may be unaffected, but values of parameters corresponding to other links and devices (e.g., the phase shift between device 102 and 104c) may have changed. If those changed parameters were included in the network fingerprint, then the addition of the link and device has changed the network fingerprint. Consequently, depending on network security policies, the request from 104a may be denied as a result of the inconsistency between the previously-determined network fingerprint and the current network fingerprint.

Returning to step 410, if the current fingerprint does match the fingerprint generated in step 404, then, in step 414, request for content may be granted. In step 416, the device 102 may remove content protection from the requested content and send the content to the device 104a.

Although the steps of FIG. 4 are described with the device 102 performing many of the steps, in other embodiments such steps could be performed by, for example, the headend 114. Similarly, although the steps of FIG. 4 are described with respect to network 100 of FIG. 1A, the steps could also be performed in the network 150 with, for example, the device 168 and/or 152 performing the steps described above as being performed by device 102.

Figure 5:
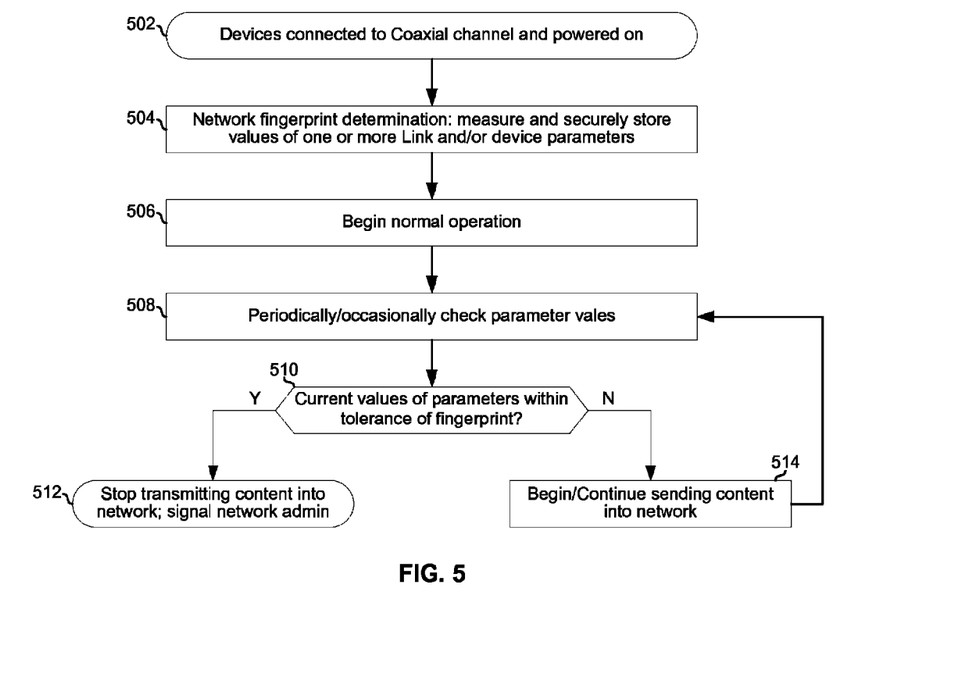
FIG. 5 is a flowchart illustrating exemplary steps for protecting content utilizing a network fingerprint.

FIG. 5 is a flowchart illustrating exemplary steps for protecting content utilizing a network fingerprint. In step 502, the devices 168, 152, 104a, 104b, and 104c may be connected to the channel comprising the links 106a-106f and powered on. In step 504, signals may be communicated among the devices 168, 152, 104a, 104b, and 104c to discover the network fingerprint. This may comprise sending signals to measure the value of one or more link and/or device parameters, and storing the measured parameter values in the IPLNB 168. After the network fingerprint has been generated, in step 408, the devices 168, 152, 104a, 104b, and 104c may enter a normal mode of operation.

In step 508, the IPLNB 168 may periodically and/or occasionally re-measure the parameter values utilized to generate the network fingerprint in step 504. In step 510, it may be determined whether the current parameter values are within a tolerance of the parameter values that were measured in step 504. If the parameter values are within the permitted tolerance of the values measured in step 504, then, in step 514, the IPLNB 168 may continue (or begin, in the case of the first time through step 514) transmitting protected content onto the network path between the IPLNB 168 and the gateway 152 (i.e., the network path consisting of IPLNB 168, link 106f and device 152). The exemplary steps may then return to step 508.

Returning to step 510, if the parameter values are not within the permitted tolerance, then in step 512 the IPLNB 168 may stop transmitting protected content onto the network path between the IPLNB 168 and the gateway 152. In some instances, the IPLNB 168 may also notify a network administrator and/or service provider of the problem with the network fingerprint.

Although the steps of FIG. 5 are described with the IPLNB 168 performing many of the steps, in other embodiments such steps could be performed by, for example, the headend 114, the device 102, and/or the device 152.

Figure 6:
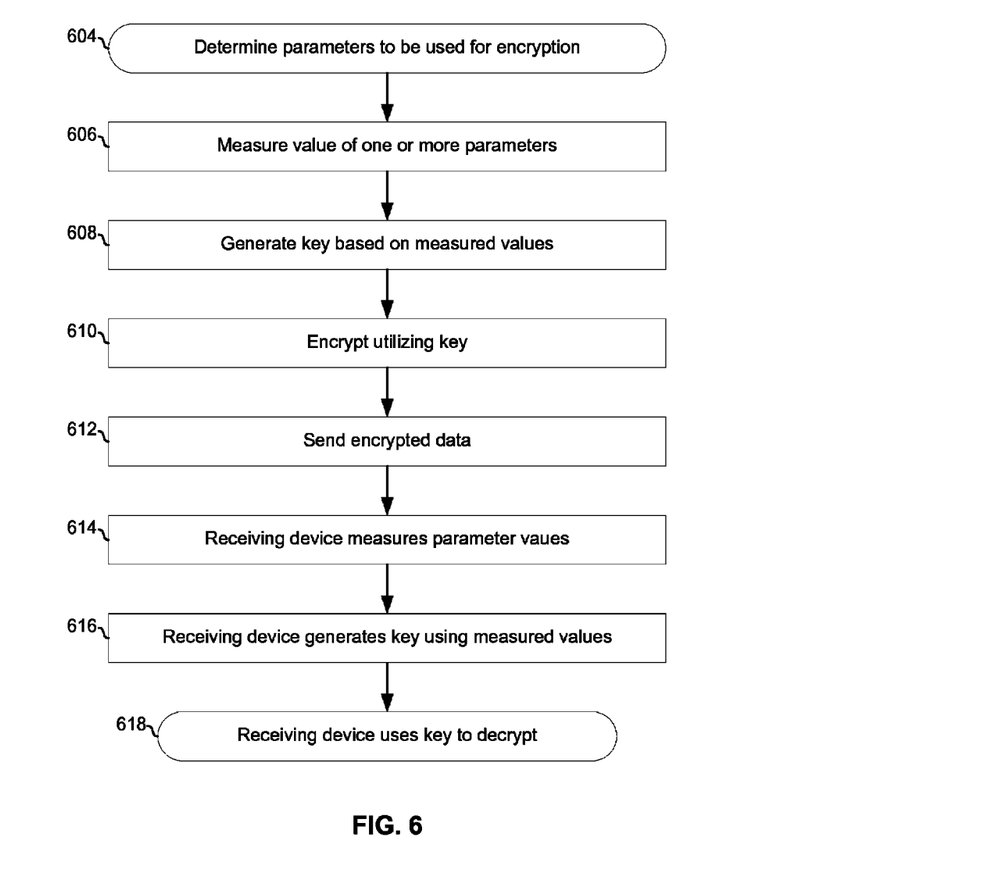
FIG. 6 is a flowchart illustrating content protection utilizing a security key generated based on a network footprint.

FIG. 6 is a flowchart illustrating content protection utilizing a security key generated based on a network footprint. In the network 100 of FIG. 1A, various portions of the steps of FIG. 6 could be performed by any one or more of the device 102, the devices 104a-c, and/or the headend 114. Similarly, in the network 150 of FIG. 1B, various portions of the steps of FIG. 6 could be performed by any one or more of the device 152, the devices 104a-c, and/or the IPLNB 168. The exemplary steps begin with step 604 in which network parameters to be utilized for securing content are selected. The parameters may, for example, be selected based on user input from a network administrator, capabilities of devices in the network, based on protocols in use in the network, based on a topology of the network, arbitrarily, and/or based on any other suitable factor(s). In step 606 values of the parameters selected in step 604 may be measured by, for example, the device 102. In step 608, the device 102 may utilize the measured parameter values to generate a security key. In step 610, the device 102 may utilize the security key to encrypt data. In step 612, the device 102 may transmit the encrypted data to, for example, the device 104b. In step 614, the device 104b may measure the same parameter values that the device 102 measured in step 606. In step 616, the device 104b may generate a security key from the measured parameter values in the same manner that the device 602 generated the security key in step 608. In step 618, the device 104b may attempt to decrypt the received data utilizing the key generated in step 616. If the parameter values measured in step 614 have not changed, or are within a permitted tolerance, of the parameter values measured in step 606, then the data may be successfully decrypted utilizing the key generated in step 616. If the parameter values measured in step 614 have changed and are not within a permitted tolerance of the parameter values measured in step 606, then the device 104b may be unsuccessful in attempting to decrypt the data.

Figure 7:
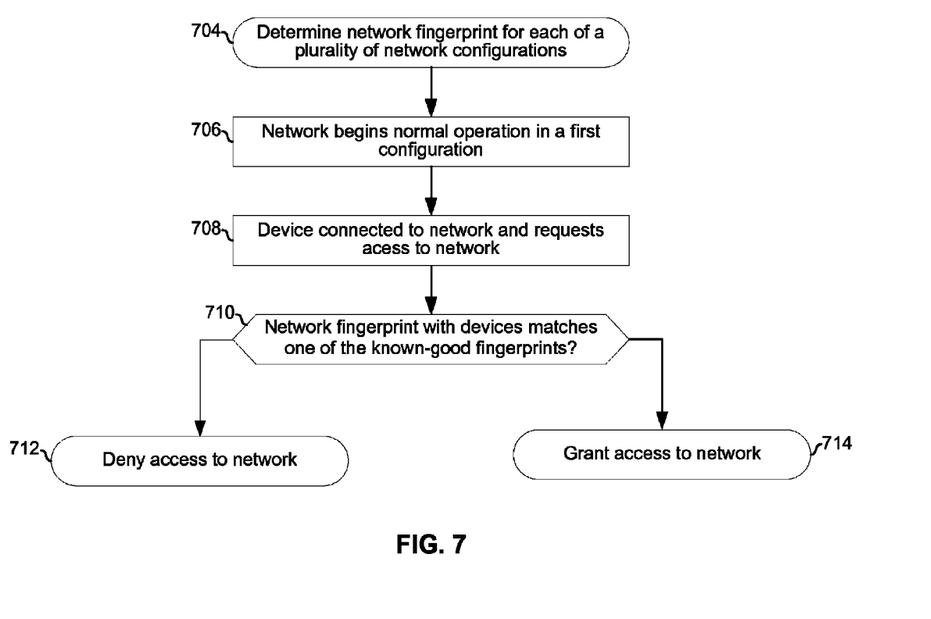
FIG. 7 is a flowchart illustrating exemplary steps for controlling access to a network based on a network fingerprint.

FIG. 7 is a flowchart illustrating exemplary steps for controlling access to a network based on a network fingerprint. In the network 100 of FIG. 1A, various portions of the steps of FIG. 6 could be performed by any one or more of the device 102, the devices 104a-c, and/or the headend 114.

Similarly, in the network 150 of FIG. 1B, various portions of the steps of FIG. 7 could be performed by any one or more of the device 152, the devices 104a-c, and/or the IPLNB 168. In step 704, the network fingerprint of the network 100 may be determined for various configurations of the network 100. Different configurations may, for example, have different ones of the devices 104a, 104b, and 104c powered off and/or disconnected from the network. For example, a first network fingerprint may be determined for a configuration in which each of devices 104a, 104b, and 104c is connected to the network 100 and powered on, and a second network fingerprint may be determined for a configuration in which the device 104b is disconnected from the network 100. The fingerprints discovered during this initialization phase may be stored (e.g., in a security processor of the device 102) as known-valid fingerprints.

In step 706, the network 100 may begin operation in the second configuration. In step 708, a device identifying itself as device 104c may be powered on and request admission to the network. In step 710, a current network fingerprint with the purported device 104c powered on may be discovered and compared to the known-valid fingerprints determined in step 706. If the current network fingerprint matches, within a tolerance, one of the known-valid fingerprints (the second known-valid fingerprint in this instance), then in step 714 it may be decided that the device is actually device 104c and admission to the network may be granted. If the current network fingerprint does not match, within a tolerance, one of the known-valid fingerprints (the second known-valid fingerprint in this instance), then in step 712 it may be decided that the device purporting to be device 104c is an imposter and admission to the network may be denied.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing conditional access based on channel characteristics.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
one or more circuits for use in a first network device of a network, said one or more circuits being operable to:
discover one or more values of one or more parameters corresponding to a plurality of links and/or a plurality of devices of said network;
generate one or more security keys utilizing said discovered one or more values;
encrypt data utilizing said one or more security keys; and
transmit said encrypted data onto a network path between said first network device and one of said plurality of devices, wherein at least one of said plurality of links and/or plurality of devices are not part of said network path.

2. The system of claim 1, wherein said one or more parameters comprise one or more of:
a clock frequency offset between two of said plurality of devices;
a clock phase offset between two of said plurality of devices; and
a clock time offset between two of said plurality of devices.

3. The system of claim 1, wherein said one or more parameters comprise a plurality of modulation profiles utilized by one or more of said plurality of devices.

4. The system of claim 1, wherein said one or more parameters comprise an amount of time required for a particular packet to be communicated, via said network, from said first network device to a particular one of said plurality of devices.

5. The system of claim 1, wherein said one or more parameters comprise an amount of time between said first network device transmitting a request and receiving a corresponding response from one or more of said plurality of devices.

6. The system of claim 1, wherein said one or more parameters comprise a length of one or more of said plurality of links.

7. The system of claim 1, wherein said one or more parameters comprise a phase response of one or more of said plurality of links.

8. The system of claim 1, wherein said one or more parameters comprise a frequency response of one or more of said plurality of links.

9. A system comprising:
one or more circuits for use in a first network device of a network, said one or more circuits being operable to:
receive encrypted data;
discover one or more values of one or more parameters corresponding to a plurality of links and/or a plurality of devices of said network, wherein at least one of said plurality of links and/or plurality of devices are not part of said network path;

generate one or more security keys utilizing said discovered one or more values; and decrypt said received encrypted data utilizing said one or more security keys.

10. The system of claim 9, wherein said one or more parameters comprise one or more of:

a clock frequency offset between two of said plurality of devices;

a clock phase offset between two of said plurality of devices; and a clock time offset between two of said plurality of devices.

11. The system of claim 9, wherein said one or more parameters comprise a plurality of modulation profiles utilized by one or more of said plurality of devices.

12. The system of claim 9, wherein said one or more parameters comprise an amount of time required for a particular packet to be communicated, via said network, from said first network device to a particular one of said plurality of devices.

13. The system of claim 9, wherein said one or more parameters comprise an amount of time between said first network device transmitting a request and receiving a corresponding response from one or more of said plurality of devices.

14. The system of claim 9, wherein said one or more parameters comprise a length of one or more of said plurality of links.

15. The system of claim 9, wherein said one or more parameters comprise a phase response of one or more of said plurality of links.

16. The system of claim 9, wherein said one or more parameters comprise a frequency response of one or more of said plurality of links.

* * * * *